US008144827B2

(12) United States Patent
Fung et al.

(10) Patent No.: US 8,144,827 B2
(45) Date of Patent: Mar. 27, 2012

(54) METHOD FOR DETERMINING A RESIDUAL FREQUENCY OFFSET, COMMUNICATION SYSTEM, METHOD FOR TRANSMITTING A MESSAGE, TRANSMITTER, METHOD FOR PROCESSING A MESSAGE AND RECEIVER

(75) Inventors: Ho Wang Fung, Singapore (SG); Sumei Sun, Singapore (SG); Chin Keong Ho, Singapore (SG); Ying Chang Liang, Singapore (SG); Yan Wu, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1071 days.

(21) Appl. No.: 11/573,680

(22) PCT Filed: Aug. 13, 2005

(86) PCT No.: PCT/SG2005/000274
§ 371 (c)(1),
(2), (4) Date: Jul. 5, 2007

(87) PCT Pub. No.: WO2006/016857
PCT Pub. Date: Feb. 16, 2006

(65) Prior Publication Data
US 2007/0280394 A1    Dec. 6, 2007

(51) Int. Cl.
*H04L 7/04* (2006.01)
(52) U.S. Cl. ........ 375/362; 375/260; 375/316; 375/340; 375/344; 375/354; 375/364; 375/365; 375/366; 375/371; 370/203; 370/208; 370/210; 370/480; 370/503; 370/508; 370/514; 455/502; 455/516

(58) Field of Classification Search .................. 375/260, 375/316, 340, 344, 362; 370/203, 208, 210, 370/480
See application file for complete search history.

(56) References Cited

U.S. PATENT DOCUMENTS
6,738,443 B1    5/2004 Böhnke et al.
(Continued)

FOREIGN PATENT DOCUMENTS
EP    1185048    8/2001
(Continued)

OTHER PUBLICATIONS
Jianhua Liu et al "A MIMO System With Backward Compatibility for OFDM Based WLANS" IEEE Jun. 2003.*
(Continued)

*Primary Examiner* — Leon Flores
(74) *Attorney, Agent, or Firm* — K. David Crockett, Esq.; Niky Economy Syrengelas, Esq.; Crockett & Crockett, PC

(57) ABSTRACT

A method of determining a residual frequency offset between a transmitter and a receiver in a transmission of data via a communication channel, is described, wherein the message is transmitted from the transmitter to the receiver via the communication channel and the message comprises at least one short preamble (201), at least one long preamble (202) and user data (203). The at least one long preamble (202) comprises residual frequency offset determination information based on which the residual frequency offset is determined.

13 Claims, 2 Drawing Sheets

U.S. PATENT DOCUMENTS

| | | |
|---|---|---|
| 2002/0122382 A1 | 9/2002 | Ma et al. |
| 2002/0181390 A1 | 12/2002 | Mody et al. |
| 2002/0181509 A1 | 12/2002 | Mody et al. |
| 2003/0058966 A1 | 3/2003 | Gilbert et al. |
| 2004/0042385 A1 | 3/2004 | Kim et al. |
| 2004/0151109 A1 | 8/2004 | Batra et al. |
| 2004/0190637 A1* | 9/2004 | Maltsev et al. ............ 375/260 |

FOREIGN PATENT DOCUMENTS

| | | |
|---|---|---|
| EP | 1445907 A2 | 8/2004 |
| JP | 2004104744 | 4/2004 |
| WO | WO2004036861 A2 | 4/2004 |

OTHER PUBLICATIONS

R. Perets et al "A New Phase and Frequency Offset Estimation Algorithm for OFDM Systems Applying Kalman Filter" IEEE Dec. 2002.*

Part 11: Wireless Lan medium access control (MAC) and physical layer (PHY) specifications: High speed physical layer in the 5 GHz band. IEEE std 802.11a-1999; Supplement to IEEE 802.11-1999, Sep. 1996.

S. Kay, Statistically/computationaly efficient fequency estimation, ICASSP'98, pp. 2292-2294, vol. 4, 1998.

* cited by examiner

METHOD FOR DETERMINING A RESIDUAL FREQUENCY OFFSET, COMMUNICATION SYSTEM, METHOD FOR TRANSMITTING A MESSAGE, TRANSMITTER, METHOD FOR PROCESSING A MESSAGE AND RECEIVER

FIELD OF THE INVENTION

The invention relates to a method for determining a residual frequency offset, a communication system, a method for transmitting a message, a transmitter, a method for processing a message and a receiver.

BACKGROUND OF THE INVENTION

In a SISO (single input single output) OFDM (orthogonal frequency division multiplexing) system, i.e. a communication system with one transmit antenna and one receiver antenna which uses modulation of a plurality of subcarriers according to OFDM for data transmission, preambles are sent before the user data is sent for various reasons. First, short preambles are sent for timing synchronisation and frequency synchronisation, in particular for frequency offset estimation.

Frequency offset estimation is necessary since in practical data communication, it cannot be expected that the local oscillator frequency at the receiver is identical to that of the signal carrier generated at the transmitter. This is for one due to circuit limitation and it particularly arises if the receiver is in relative motion to the transmitter as Doppler shift is inevitably introduced to the carrier frequency.

A frequency offset may lead to inter-carrier interference (ICI). For a multicarrier system, such as one that adopts OFDM, a residual frequency offset results in a significant performance degradation.

After the short preambles, relatively few long preambles are sent in a SISO OFDM system (two in case of a system according to the IEEE802.11a standard, see [1]) which are employed for channel estimation. Since only a single channel is established, few long preambles are enough for channel estimation.

In case of a MIMO (Multiple Input Multiple Output) system where a plurality of transmit antennas are used, however, a higher number of long preambles is necessary in order for all channel information to be extracted since a plurality of physical channels are employed for transmission. In fact, it can be shown that in case of a MIMO system, the number of long preambles should be no less than the number of transmit antennas.

Such an increase of the number of long preambles compared to a SISO system has the consequence that the time for transmission of the long preambles, also called the long preamble duration, is increased compared to a SISO system. This gives rise to a more substantial rotation of the phase in the data symbols succeeding the long preambles in the presence of a residual frequency offset which is involuntary due to the finite number of short preambles for frequency offset estimation (FOE) in a practical communication system.

Due to the severity of the distortion, the data symbols sent first can typically not be adequately corrected and error bits and error packets are caused.

In [2] an estimator for frequency estimation is described.

An object of the invention is to provide a method for improved residual frequency offset estimation in communication systems.

The object is achieved by a method for determining a residual frequency offset, a communication system, a method for transmitting a message by a transmitter, a transmitter, a method for processing a message and a receiver with the features according to the independent claims.

SUMMARY OF THE INVENTION

A method for determining a residual frequency offset between a transmitter and a receiver in a transmission of data via a communication channel is provided, wherein a message is transmitted from the transmitter to the receiver via the communication channel. The message comprises at least one short preamble, at least one long preamble and user data and the at least one long preamble comprises residual frequency offset determination information. The residual frequency offset is determined based on the residual frequency offset determination information.

Further, a method for transmitting a message by a transmitter is provided, wherein a message is generated wherein the message comprises at least one short preamble, at least one long preamble and user data and the at least one long preamble comprises residual frequency offset determination information and the message is transmitted to a receiver via a communication channel. The residual frequency offset determination information allows the receiver to determine a residual frequency offset between the transmitter and the receiver in the transmission of data via the communication channel.

Further, a method for processing a message by a receiver is provided wherein a message is received from a transmitter via a communication channel which message comprises at least one short preamble, at least one long preamble and user data, wherein the at least one long preamble comprises residual frequency offset determination information. A residual frequency offset between the transmitter and the receiver in a transmission of data via the communication channel is determined based on the residual frequency offset determination information.

Further, a communication system, a transmitter and a receiver according to the method for determining a residual frequency offset, the method for transmitting a message and the method for processing a message described above are provided.

SHORT DESCRIPTION OF THE FIGURES

DETAILED DESCRIPTION

Figure 1:
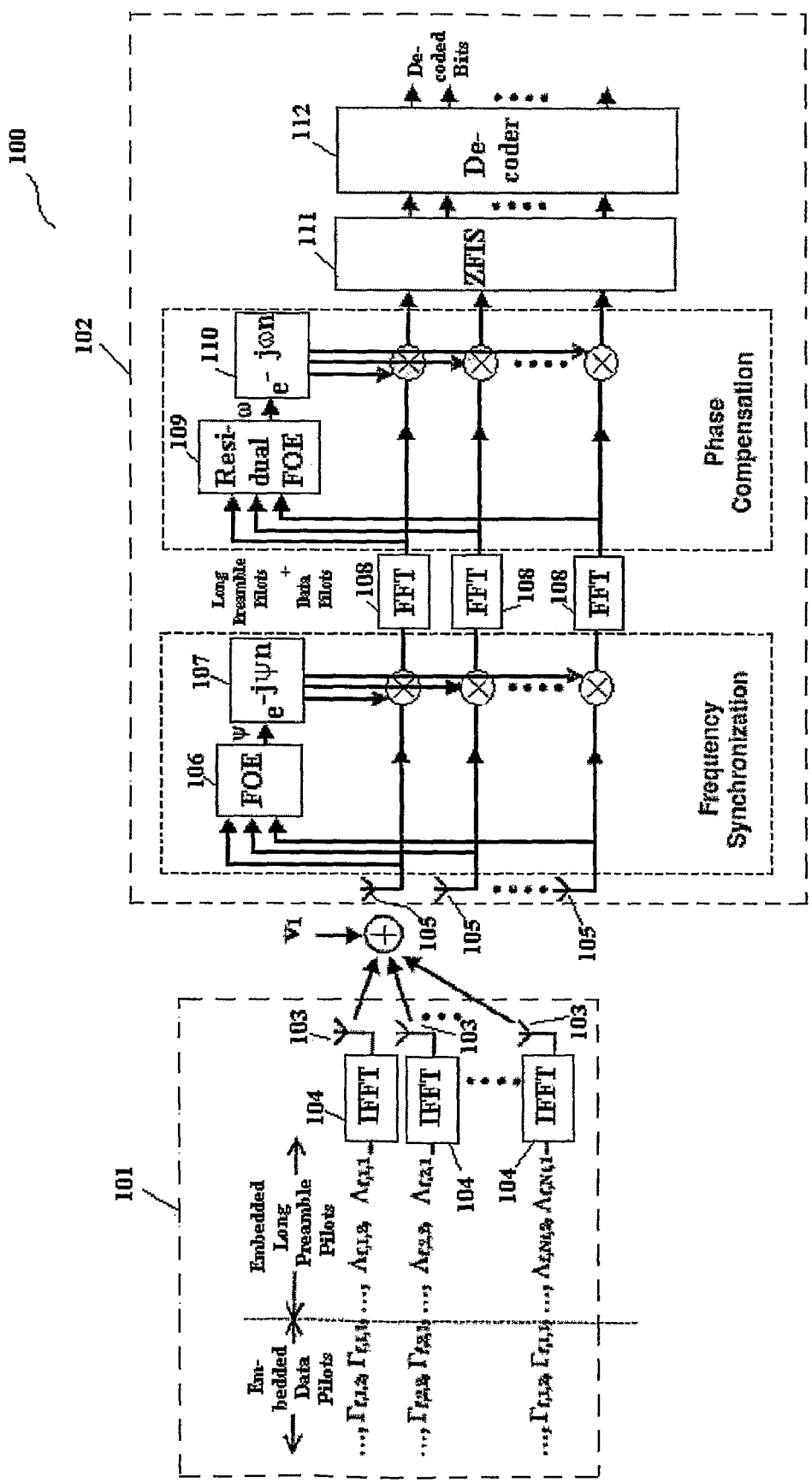
FIG. 1 shows a communication system according to an embodiment of the invention.

Illustratively, the long preambles are used for residual offset estimation. In this way, even when a lot of long preambles are transmitted, as it is the case in case of a MIMO (multiple input multiple output) system, since relatively many long preambles are necessary for channel estimation, the residual frequency offset can be estimated and compensated without data loss.

The invention is for example applicable to communication systems according to WLAN 11n, i.e. for wireless local area networks, but may also be applicable to large area communication systems such as mobile telephone communication systems.

Embodiments of the invention emerge from the dependent claims. The embodiments which are described in the context of the method for determining a residual frequency offset are analogously valid for the communication system, the method for transmitting a message, the transmitter, the method for processing a message and the receiver.

In one embodiment, at least one short preamble comprises frequency offset determination information and a frequency offset is determined based on the frequency offset determination information.

The data can comprise further residual frequency offset determination information and a residual frequency offset determination can be carried out based on the further residual frequency offset determination information.

In one embodiment, the communication channel comprises at least one data subchannel and at least one pilot subchannel.

The at least one long preamble may further comprise channel estimation information based on which a channel estimation is performed to determine the transmission characteristics of the communication channel and the frequency offset determination information may be transmitted via the least one pilot subchannel and the channel estimation information may be transmitted via the at least one data subchannel.

This means that the pilot subchannels are used in the period of long preamble transmission to transmit special symbols (i.e. pilot symbols), that allow the receiver to perform a residual frequency offset estimation.

In one embodiment the message is transmitted via a plurality of transmit antennas. The message may be received via a plurality of receive antennas.

The message is for example transmitted according to OFDM.

In one embodiment, when the residual frequency offset has been determined based on the residual frequency offset determination information, a phase compensation is carried out for at least one signal value which is received in the transmission of the message based on the determined residual frequency offset.

For example, at one moment in time based on the frequency offset determination information transmitted so far, a residual frequency offset determination may be carried out and all signal values received in the following are corrected (i.e. phase compensated) based on the determined frequency offset. When successively more residual frequency offset determination information is received in the course of time, the residual frequency offset may be determined again to improve the current estimate of the residual frequency offset.

In the embodiment described below, special pilots embedded in both long preambles and data are described. A recursive estimation algorithm based on the linear prediction method in [2] is described and a compensation formula that counteracts the effect on both the channel estimate and the data is given.

Illustrative embodiments of the invention are explained below with reference to the drawings.

FIG. 1 shows a communication system 100 according to an embodiment of the invention.

The communication system 100 comprises a transmitter 101 (only partly shown in FIG. 1) and a receiver 102.

The transmitter 101 comprises a plurality of transmit antennas 103, wherein each transmit antenna 103 is used for signal transmission. Data (user data, preambles, etc.) to be sent by a transmit antenna 103 in form of a radio signal is supplied to the transmit antenna 103 by a respective IFFT (inverse fast Fourier transform) unit 104. Radio signals transmitted by the transmitter 101 are received by the receiver 102 via a plurality of receiver antennas 105.

Modulation of subcarriers according to OFDM (orthogonal frequency division multiplexing) is used for the transmission of signal values form the transmit antennas 103 to the receiver antennas 105.

As the local oscillator in the receiver 102 cannot be guaranteed to operate at exactly the same frequency as the one in the transmitter 101 due to relative motion or imperfection in hardware circuitries, the disparity gives rise to a frequency offset which rotates the received signals by an angle that grows with time.

Therefore, short preambles are sent prior to user data. This is illustrated in FIG. 2.

Figure 2:
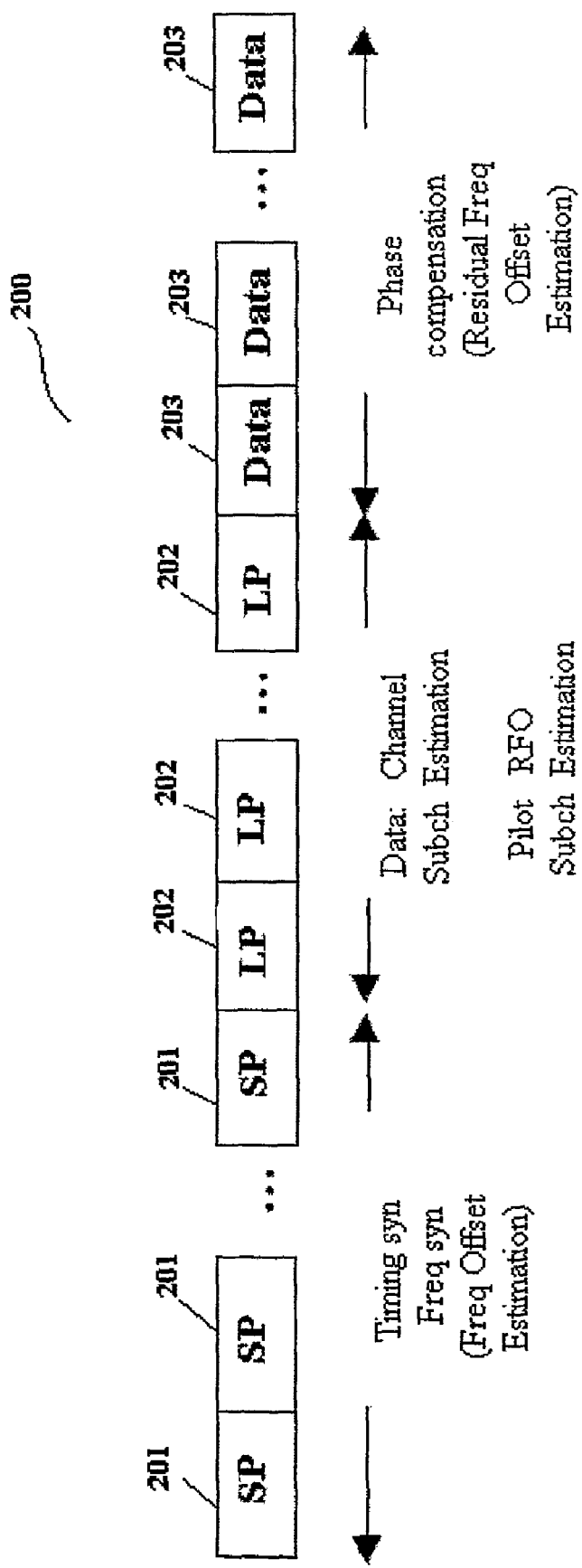
FIG. 2 shows a transmission block according to an embodiment of the invention.

FIG. 2 shows a transmission block 200 according to an embodiment of the invention.

The transmission block 200 is sent from the left to the right, i.e. the elements of the transmission block 200 farthest to the left are sent first.

The transmission block 200 comprises short preambles 201 that are sent first and which are used for frequency offset estimation (FOE) by a FOE unit 106 of the receiver 102 after reception of the short preambles. The FOE unit 106 estimates the frequency offset, in FIG. 1 denoted by $\psi$. A frequency offset compensation unit 107 receives the frequency offset estimate $\psi$ as input and compensates the frequency offset for all further received signal values.

After frequency offset compensation, there remains a residual frequency offset, although usually a small quantity, in the form of inter-carrier interference that destroys the orthogonality among the frequency subchannels and could thus—if not compensated for—cause total system failure.

In the IEEE802.11a standard, frequency subchannels of indices [8,22,44,58] (with reference to the convention from 1 to 64) are dedicated for pilot transmission in a SISO (single input single output) system with 64 frequency subcarriers. It is assumed that the communication system 100 is a MIMO (multiple input multiple output) system with $N_t$ transmit antennas 103 and $N_r$ receive antennas 105. The same frequency subchannels as in the IEEE802.11a standard, i.e. the frequency subchannels of the indices [8,22,44,58] are used in this embodiment for the delivery of pilot symbols as is described in the following.

The transmission block 200 comprises a plurality of long preambles 202 which are sent after the short preambles.

The signal values of the long preambles 202 that are transmitted in the frequency subchannels of the indices [8,22,44, 58] are given by the signal values $\Lambda_{f,t,n}$ wherein $\Lambda_{f,t,n}$ denotes the signal value which is transmitted in subchannel f via transmit antenna t at time n. These signal values are also referred to as the pilots embedded in the long preambles.

The receiver 102 receives via transmit antenna r and subchannel f at time n the discrete signal value (in the frequency domain)

$$L_{f,r,n} = \left(\sum_{t=1}^{N_t} H_{f,r,t} \Lambda_{f,t,n}\right) e^{j64\omega n} + V_{f,r,n} \quad (1)$$

where $H_{f,r,t}$ is the channel gain of the subchannel f established between transmit antenna t and receive antenna r, $\omega$ denotes the residual frequency offset at the receiver 102 (as explained above after performing frequency offset estimation and frequency offset compensation based on the short preambles 201) and $V_{f,r,n}$ is the AWGN sample.

The time index n is chosen such that n=1 corresponds to the first of the long preambles 201 and n=$N_{LP}$ corresponds to the last of the long preambles 201.

In the following, the selection of the $\Lambda_{f,t,n}$ corresponding to f∈[8, 22, 44, 58] is explained. The $L_{f,r,n}$ corresponding to these $\Lambda_{f,t,n}$ according to equation (1) are used, after being processed by a respective FFT unit 108, by a residual frequency offset estimation unit 109 to estimate the residual frequency offset ω.

It can be seen from (1) that if $\Lambda_{f,t,n}$ is designed to be independent of t such that $\Lambda_{f,t,n}=\Lambda_{f,t}$, ∀t=1, 2, . . . , $N_t$, then the signal $$\frac{L_{f,r,n}}{\Lambda_{f,n}} = \left(\sum_{t=1}^{N_t} H_{f,r,t}\right)e^{j64\omega n} + \frac{V_{f,r,n}}{\Lambda_{f,n}} \quad (2)$$

will sketch a complex sinusoid in n for every f and r when the noise samples at different times n are shaped to the same variance by setting $$|\Lambda_{f,t}| = \sigma_x^2$$

which implies a fixed power in each pilot symbol.

Since f∈[8, 22, 44, 58] and r∈[1, 2, . . . , $N_r$], there exist $4N_r$ independent complex sinusoids of different amplitudes $$\sum_{t=1}^{N_t} H_{f,r,t}$$

but equal frequency 64ω.

To conform to the pilot values in IEEE802.11a (see [1]) as closely as possible, the assignment
$\Lambda_{8,n}=-\Lambda_{22,n}=\Lambda_{44,n}=\Lambda_{58,n}=1$ is used in this embodiment.

A cyclic-prefix-free long preamble design is used in this embodiment. In this case, the last 16 of the 64 samples in each long preamble symbol in the time domain need to be independent of n. This implies that $\Lambda_{f,n}=\Lambda_f$ for f∈[8, 22, 44, 58]. The above criteria can be summarized as C1) transmit antenna independence to produce independent complex sinusoids at the receiver 102

C2) subchannel pilot value assignment in consistence with IEEE802.11a standard

C3) time independence to satisfy requirement for cyclic-prefix-free long preamble design These criteria can be fulfilled by appointing $$\Lambda_{f,t,n} = \begin{cases} 1, & \text{if } f \in \{8, 44, 58\} \\ -1, & \text{if } f = 22 \end{cases} \quad (3)$$

For $N_t$=6 and $N_r$=3, this is illustrated by table 1 for the subchannels f∈[8, 44, 58] and is illustrated by table 2 for the subchannel f=22.

TABLE 1

| | | transmit antenna index → | | | |
|---|---|---|---|---|---|
| time index ↓ | 1 | 1 | 1 | 1 | 1 | 1 |
| | 1 | 1 | 1 | 1 | 1 | 1 |

TABLE 1-continued

| | | transmit antenna index → | | | |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

TABLE 2

| | | transmit antenna index → | | | |
|---|---|---|---|---|---|
| time index ↓ | −1 | −1 | −1 | −1 | −1 | −1 |
| | −1 | −1 | −1 | −1 | −1 | −1 |
| | −1 | −1 | −1 | −1 | −1 | −1 |
| | −1 | −1 | −1 | −1 | −1 | −1 |
| | −1 | −1 | −1 | −1 | −1 | −1 |
| | −1 | −1 | −1 | −1 | −1 | −1 |

With (2), the problem of phase compensation is turned into one of the single tone parameter estimation, which is classical in the field of signal processing with a variety of ready solutions in the literature. The linear prediction estimator (see [2]) works to a reasonable accuracy at an affordable computational complexity and is particularly appealing in terms of implementation compared with Kay's estimator introduced in [2]. When applied to (2) for a single subchannel f and a single receive antenna r, the estimator output reads $$\hat{\omega} = \frac{1}{64}\angle \sum_{n=2}^{N_{LP}} \left(\frac{L_{f,r,n}}{\Lambda_{f,n}}\right)\left(\frac{L_{f,r,n-1}}{\Lambda_{f,n-1}}\right)^* = \frac{1}{64}\angle \sum_{n=2}^{N_{LP}} L_{f,r,n}L_{f,r,n-1}^* \quad (4)$$

For $N_t$=6 and $N_r$=3 the $L_{f,r,n}$ received by the receiver 102 are illustrated in tables 3 to 5 (where time grows downwards in the tables).

TABLE 3

| receive antenna 1 | | | |
|---|---|---|---|
| $L_{8,1,1}$ | $L_{22,1,1}$ | $L_{44,1,1}$ | $L_{58,1,1}$ |
| $L_{8,1,2}$ | $L_{22,1,2}$ | $L_{44,1,2}$ | $L_{58,1,2}$ |
| $L_{8,1,3}$ | $L_{22,1,3}$ | $L_{44,1,3}$ | $L_{58,1,3}$ |
| $L_{8,1,4}$ | $L_{22,1,4}$ | $L_{44,1,4}$ | $L_{58,1,4}$ |
| $L_{8,1,5}$ | $L_{22,1,5}$ | $L_{44,1,5}$ | $L_{58,1,5}$ |
| $L_{8,1,6}$ | $L_{22,1,6}$ | $L_{44,1,6}$ | $L_{58,1,6}$ |

TABLE 4

| receive antenna 2 | | | |
|---|---|---|---|
| $L_{8,2,1}$ | $L_{22,2,1}$ | $L_{44,2,1}$ | $L_{58,2,1}$ |
| $L_{8,2,2}$ | $L_{22,2,2}$ | $L_{44,2,2}$ | $L_{58,2,2}$ |
| $L_{8,2,3}$ | $L_{22,2,3}$ | $L_{44,2,3}$ | $L_{58,2,3}$ |
| $L_{8,2,4}$ | $L_{22,2,4}$ | $L_{44,2,4}$ | $L_{58,2,4}$ |
| $L_{8,2,5}$ | $L_{22,2,5}$ | $L_{44,2,5}$ | $L_{58,2,5}$ |
| $L_{8,2,6}$ | $L_{22,2,6}$ | $L_{44,2,6}$ | $L_{58,2,6}$ |

TABLE 5

| receive antenna 3 | | | |
|---|---|---|---|
| $L_{8,3,1}$ | $L_{22,3,1}$ | $L_{44,3,1}$ | $L_{58,3,1}$ |
| $L_{8,3,2}$ | $L_{22,3,2}$ | $L_{44,3,2}$ | $L_{58,3,2}$ |
| $L_{8,3,3}$ | $L_{22,3,3}$ | $L_{44,3,3}$ | $L_{58,3,3}$ |
| $L_{8,3,4}$ | $L_{22,3,4}$ | $L_{44,3,4}$ | $L_{58,3,4}$ |

TABLE 5-continued

| receive antenna 3 | | | |
|---|---|---|---|
| $L_{8,3,5}$ | $L_{22,3,5}$ | $L_{44,3,5}$ | $L_{58,3,5}$ |
| $L_{8,3,6}$ | $L_{22,3,6}$ | $L_{44,3,6}$ | $L_{58,3,6}$ |

On account of $\Lambda_{f,t,n}$ being independent of t and n by design (as described above), each column in tables 3 to 5 forms a complex sinusoid of a different amplitude but equal frequency. Using the received long preambles, i.e. using the $L_{f,r,n}$, the residual frequency offset estimation unit 109 generates residual frequency offset estimates $\hat{\omega}_{LP,n}$ (depending on the current time given by the time index n) according to $$a_{LP,1} = 0, \tag{5}$$

$$a_{LP,n} = a_{LP,n-1} + \sum_{f \in [8,22,44,58]} \sum_{r=1}^{3} L_{f,r,n} L^*_{f,r,n-1}, n=2,3,\cdots,N_{LP}$$

$$\hat{\omega}_{LP,n} = \frac{\angle a_{LP,n}}{64}$$

which is an extension of (4). The time index n=2 corresponds to the second long preamble of the long preambles 202, n=3 refers to the third long preamble of the long preambles 202 and so on. Note that the residual frequency offset estimate $\hat{\omega}_{LP,n}$ is dependent on time (note the time index n). When more $L_{f,r,n}$ become available in the receiver 102 (corresponding to a growing time index n) the residual frequency offset estimate will typically become better. When all long preambles 202 have been transmitted, the residual FOE unit 109 will have generated the residual frequency offset estimate $\hat{\omega}_{LP,N_{LP}}$.

Finally, the transmission block 200 comprises a plurality of data symbols 203 which are transmitted by the transmitter 101 after the long preambles 202.

The signal values of the data symbols 203 that are transmitted in the frequency subchannels of the indices [8, 22, 44, 58] are given by the signal values $\Gamma_{f,t,n}$ wherein $\Gamma_{f,t,n}$ denotes the signal value which is transmitted in subchannel f via transmit antenna t at time n. These symbols are also referred to as the pilots embedded in the data symbols.

The pilots embedded in the data symbols can be developed following similar principles as the pilots embedded in the long preambles. In contrast to (1), the received signal values $D_{f,r,n}$ corresponding to the $\Gamma_{f,t,n}$ are given by $$D_{f,r,n} = \left(\sum_{t=1}^{N_t} H_{f,r,t} \Gamma_{f,t,n}\right) e^{j80\omega n} + \tilde{V}_{f,r,n} \tag{6}$$

where as above, f specifies the subchannel, t the transmit antenna, r the receive antenna and n is the time index.

To distinguish from $V_{f,r,n}$, a different notation $\tilde{V}_{f,r,n}$ is adopted for AWGN (additive white gaussian noise) samples. Unlike the long preambles $\Lambda_{f,t,n}$ which can be manipulated so that no cyclic-prefix is required, the data signal values $\Gamma_{f,t,n}$ assume no such freedom. In the case of OFDM (orthogonal frequency division multiplexing), that is used in this embodiment, the presence of cyclic prefix sets each OFDM symbol to 80 M-ary symbols in length.

Consequently, the frequency in (6) is 80ω instead of 64ω) in (1) and criteria C3 above is no longer applicable. The pilots are thus chosen independent of t but dependent on f and n, or quantitatively $$\Gamma_{f,t,n} = \begin{cases} k_n, & \text{if } f \in \{8, 44, 58\} \\ -k_n, & \text{if } f = 22 \end{cases} \tag{7}$$

where $k_n \in \{1, -1\}$ is a function of n in compliance with the pseudorandom sequence for the SISO pilots specified in the IEEE802.11a standard (see [1]).

The definition according to (7) is illustrated for $N_t=6$ and $N_r=3$, for the subchannels f∈[8, 44, 58] in table 6 and is illustrated by table 7 for the subchannel f=22.

TABLE 6

| | transmit antenna index → | | | | | |
|---|---|---|---|---|---|---|
| time index ↓ | $k_1$ | $k_1$ | $k_1$ | $k_1$ | $k_1$ | $k_1$ |
| | $k_2$ | $k_2$ | $k_2$ | $k_2$ | $k_2$ | $k_2$ |
| | $k_3$ | $k_3$ | $k_3$ | $k_3$ | $k_3$ | $k_3$ |
| | . | . | . | . | . | . |
| | . | . | . | . | . | . |
| | . | . | . | . | . | . |

TABLE 7

| | transmit antenna index → | | | | | |
|---|---|---|---|---|---|---|
| time index ↓ | $-k_1$ | $-k_1$ | $-k_1$ | $-k_1$ | $-k_1$ | $-k_1$ |
| | $-k_2$ | $-k_2$ | $-k_2$ | $-k_2$ | $-k_2$ | $-k_2$ |
| | $-k_3$ | $-k_3$ | $-k_3$ | $-k_3$ | $-k_3$ | $-k_3$ |
| | . | . | . | . | . | . |
| | . | . | . | . | . | . |
| | . | . | . | . | . | . |

The pilots embedded in the data symbols, i.e. the $D_{f,t,n}$ for f∈[8, 22, 44, 58] are used similarly as the pilots embedded in the long preambles by the residual frequency offset estimation unit 109 to estimate the residual frequency offset.

The counter part of (4) in estimating each of the tone frequency in the $4N_r$ subchannels is $$\hat{\omega} = \tag{8}$$

$$\frac{1}{80} \angle \sum_{n=2}^{\infty} \left(\frac{D_{f,r,n}}{\Gamma_{f,n}}\right)\left(\frac{D_{f,r,n-1}}{\Gamma_{f,n-1}}\right)^* = \frac{1}{80} \angle \sum_{n=2}^{\infty} k_n k_{n-1} D_{f,r,n} D^*_{f,r,n-1}.$$

Equation (8) is arrived at based on (7) and the property that $k_n \in \{1, -1\}$ by design. By extending to multiple subchannels and rewriting in recursive form, (8) becomes $$a_{DATA,0} = a_{LP,N_{LP}} e^{j\frac{5}{4} \angle a_{LP,N_{LP}}}, \tag{9}$$

$$k_0 = 1,$$

$$D_{f,r,0} = L_{f,r,N_{LP}},$$

$$a_{DATA,n} = a_{DATA,n-1} + k_n k_{n-1} \sum_{f \in [8,22,44,58]} \sum_{r=1}^{3} D_{f,r,n} D^*_{f,r,n-1},$$

$$n = 1, 2, \cdots,$$

$$\hat{\omega}_{DATA,n} = \frac{\angle a_{DATA,n}}{80},$$

The accumulated sum $a_{LP,N_{LP}}$ that is generated by the residual FOE unit 109 based on the long preambles according to (5) is used as the first value in $a_{DATA,n}$ for accuracy enhancement. The exponential factor in the first line of (9) is introduced to account for the difference in frequency arising from the absence of cyclic prefix in the long preambles as indicated in (2) and (6).

In one embodiment, there may be two signal field symbols and n=1 corresponds to the first signal field (SF) symbol, n=2 to the second SF symbol, n=3 to the first data symbol and so on.

For $N_t=6$ and $N_r=3$ the $D_{f,r,n}$ received by the receiver 102 are illustrated in tables 8 to 10 (where time grows downwards in the tables).

TABLE 8

| normalized receive antenna 1 values | | | |
|---|---|---|---|
| $k_1 D_{8,1,1}$ | $k_1 D_{22,1,1}$ | $k_1 D_{44,1,1}$ | $k_1 D_{58,1,1}$ |
| $k_2 D_{8,1,2}$ | $k_2 D_{22,1,2}$ | $k_2 D_{44,1,2}$ | $k_2 D_{58,1,2}$ |
| $k_3 D_{8,1,3}$ | $k_3 D_{22,1,3}$ | $k_3 D_{44,1,3}$ | $k_3 D_{58,1,3}$ |
| . | . | . | . |
| . | . | . | . |

TABLE 9

| normalized receive antenna 2 values | | | |
|---|---|---|---|
| $k_1 D_{8,2,1}$ | $k_1 D_{22,2,1}$ | $k_1 D_{44,2,1}$ | $k_1 D_{58,2,1}$ |
| $k_2 D_{8,2,2}$ | $k_2 D_{22,2,2}$ | $k_2 D_{44,2,2}$ | $k_2 D_{58,2,2}$ |
| $k_3 D_{8,2,3}$ | $k_3 D_{22,2,3}$ | $k_3 D_{44,2,3}$ | $k_3 D_{58,2,3}$ |
| . | . | . | . |
| . | . | . | . |

TABLE 10

| normalized receive antenna 3 values | | | |
|---|---|---|---|
| $k_1 D_{8,3,1}$ | $k_1 D_{22,3,1}$ | $k_1 D_{44,3,1}$ | $k_1 D_{58,3,1}$ |
| $k_2 D_{8,3,2}$ | $k_2 D_{22,3,2}$ | $k_2 D_{44,3,2}$ | $k_2 D_{58,3,2}$ |
| $k_3 D_{8,3,3}$ | $k_3 D_{22,3,3}$ | $k_3 D_{44,3,3}$ | $k_3 D_{58,3,3}$ |
| . | . | . | . |
| . | . | . | . |

Each of the columns in tables 8 to 10 can be regarded as a single complex sinusoid.

In the following, the effect of a residual frequency offset in the time domain on the symbols in the frequency domain is discussed. For ease of presentation, the noiseless case is considered, although the same argument applies otherwise. Suppose a time sequence $y_n$, n=1, 2, ..., N, is multiplied with the complex sinusoid $e^{j(\omega n + \phi)}$ where $\omega \ll 1$. Upon performing discrete Fourier transform on the product, the frequency domain signal can be written in matrix form as $$\underline{y}_f = \underline{F P y}_t \qquad (10)$$

where $\underline{y}_t = [y_1 \ y_2 \ \ldots \ y_N]^T$, $P = \text{diag}\{e^{j(\omega + \phi)} \ e^{j(\omega 2 + \phi)} \ \ldots \ e^{j(\omega N + \phi)}\}$ and $\underline{F}$ is the Fourier transform matrix.

If the effect of the sinusoid is to be modelled in the frequency domain with a diagonal matrix Q by $$\underline{y}_f \approx \underline{Q F y}_t \qquad (11)$$

then $$\underline{Q} = \underline{F P F}^H \approx \frac{\sum_{k=1}^N e^{j(\omega k + \phi)}}{N} I = e^{j(\omega \frac{N+1}{2} + \phi)} \left[ \frac{\sin\left(\frac{\omega N}{2}\right)}{N \sin\left(\frac{\omega}{2}\right)} \right] I. \qquad (12)$$

The above approximation applies for the matrix F and any orthogonal transform having fixed power in every element like the Hadamard matrix, and is exact at the diagonal entries. Based on such an approximation, the time domain models and frequency domain models are related as depicted in table 11.

TABLE 11

| | Time domain | Freq domain |
|---|---|---|
| CP0 | $\begin{bmatrix} e^{j\omega} \\ e^{j\omega 2} \\ \vdots \\ e^{j\omega 16} \end{bmatrix} \odot \underline{y}_{CP0}$ | discarded |
| LP1 | $\begin{bmatrix} e^{j\omega 17} \\ e^{j\omega 18} \\ \vdots \\ e^{j\omega 80} \end{bmatrix} \odot \underline{y}_{CP1}$ | $e^{j\omega \frac{80+17}{2}} \left[ \frac{\sin(32\omega)}{64 \sin\left(\frac{\omega}{2}\right)} \right] \underline{F y}_{LP1}$ |
| $\vdots$ | $\vdots$ | $\vdots$ |
| $LP N_{LP}$ | $\begin{bmatrix} e^{j\omega[64(N_{LP}-1)+17]} \\ e^{j\omega[64(N_{LP}-1)+18]} \\ \vdots \\ e^{j\omega[64(N_{LP}-1)+80]} \end{bmatrix} \odot \underline{y}_{LP,N_{LP}}$ | $e^{j\omega[64(N_{LP}-1)+\frac{80+17}{2}]} \left[ \frac{\sin(32\omega)}{64 \sin\left(\frac{\omega}{2}\right)} \right] \underline{F y}_{LP,N_{LP}}$ |
| CP1 | $\begin{bmatrix} e^{j\omega(64 N_{LP}+17)} \\ e^{j\omega(64 N_{LP}+18)} \\ \vdots \\ e^{j\omega(64 N_{LP}+32)} \end{bmatrix} \odot \underline{y}_{CP1}$ | discarded |
| Data 1 | $\begin{bmatrix} e^{j\omega(64 N_{LP}+33)} \\ e^{j\omega(64 N_{LP}+34)} \\ \vdots \\ e^{j\omega(64 N_{LP}+96)} \end{bmatrix} \odot \underline{y}_{DT1}$ | $e^{j\omega(64 N_{LP}+\frac{96+33}{2})} \left[ \frac{\sin(32\omega)}{64 \sin\left(\frac{\omega}{2}\right)} \right] \underline{F y}_{DT1}$ |
| $\vdots$ | $\vdots$ | $\vdots$ |
| CP2 | $\begin{bmatrix} e^{j\omega[64 N_{LP}+80(n-1)+17]} \\ e^{j\omega[64 N_{LP}+80(n-1)+18]} \\ \vdots \\ e^{j\omega[64 N_{LP}+80(n-1)+32]} \end{bmatrix} \odot \underline{y}_{CP2}$ | discarded |
| Data n | $\begin{bmatrix} e^{j\omega[64 N_{LP}+80(n-1)+33]} \\ e^{j\omega[64 N_{LP}+80(n-1)+34]} \\ \vdots \\ e^{j\omega[64 N_{LP}+80(n-1)+96]} \end{bmatrix} \odot \underline{y}_{DT_n}$ | $e^{j\omega(64 N_{LP}+80(n-1)+\frac{96+33}{2})} \left[ \frac{\sin(32\omega)}{64 \sin\left(\frac{\omega}{2}\right)} \right] \underline{F y}_{DT_n}$ |
| $\vdots$ | $\vdots$ | $\vdots$ |

While the $N_{LP}$ long preambles share one single cyclic prefix of 16 samples, the succeeding data symbols own a cyclic prefix each. As the model shows, the discrete signals at receiver antenna r in the long preamble and the data symbol segments are given respectively by $$e^{j64\omega\left(n-\frac{31}{128}\right)}\left[\frac{\sin(32\omega)}{64\sin\left(\frac{\omega}{2}\right)}\right]Fy_{LP,n}, \quad n=1,2,\cdots,N_{LP} \tag{13}$$

and $$e^{j80\omega\left(n+\frac{128N_{LP}-31}{160}\right)}\left[\frac{\sin(32\omega)}{64\sin\left(\frac{\omega}{2}\right)}\right]Fy_{DT,n}, \quad n=1,2,3,\cdots. \tag{14}$$

As the received signal values are phase rotated in both the time and frequency domains, the channel identified based on the distorted long preambles can deviate considerably from the actual channel on account of the effect of residual frequency offset ω over a relatively long estimation interval in a MIMO system. In accordance with (13), the $N_{LP}$ long preambles collected at subchannel f and receiver antenna r are related to the channel gain $H_{f,r,t}$ and the transmitted values $\Lambda_{f,t,n}$ by $$\begin{bmatrix} L_{f,r,1} \\ L_{f,r,2} \\ \vdots \\ L_{f,r,N_{LP}} \end{bmatrix} = \tag{15}$$

$$\left[\frac{\sin(32\omega)}{64\sin\left(\frac{\omega}{2}\right)}\right]\begin{bmatrix} e^{j64\omega\left(1-\frac{31}{128}\right)} & & 0 \\ & e^{j64\omega\left(2-\frac{31}{128}\right)} & \\ & & \ddots \\ 0 & & & e^{j64\omega\left(N_{LP}-\frac{31}{128}\right)} \end{bmatrix} \cdot$$

$$\begin{bmatrix} \Lambda_{f,1,1} & \Lambda_{f,2,1} & \cdots & \Lambda_{f,N_t,1} \\ \Lambda_{f,1,2} & \Lambda_{f,2,2} & \cdots & \Lambda_{f,N_t,2} \\ \vdots & \vdots & \ddots & \vdots \\ \Lambda_{f,1,N_{LP}} & \Lambda_{f,2,N_{LP}} & \cdots & \Lambda_{f,N_t,N_{LP}} \end{bmatrix}\begin{bmatrix} H_{f,r,1} \\ H_{f,r,2} \\ \vdots \\ H_{f,r,N_t} \end{bmatrix}$$

In matrix form, $$L_f = \left[\frac{\sin(32\omega)}{64\sin\left(\frac{\omega}{2}\right)}\right]\bar{P}\Delta_f h_{f,r}$$

can be written. The conventional LS channel estimate with no consideration of residual frequency offset is given by $$\hat{h}_{f,r} = \left(\Delta_f^H \Delta_f\right)^{-1}\Delta_f^H L_f \tag{16}$$

$$= \left[\frac{\sin(32\omega)}{64\sin\left(\frac{\omega}{2}\right)}\right]\left(\Delta_f^H \Delta_f\right)^{-1}\left(\Delta_f^H \bar{P}\Delta_f\right)h_{f,r}$$

$$\approx e^{j64\omega\left(\frac{N_{LP}+1}{2}-\frac{31}{128}\right)}\left[\frac{\sin(32\omega)}{64\sin\left(\frac{\omega}{2}\right)}\right]\left[\frac{\sin(32\omega N_{LP})}{N_{LP}\sin(32\omega)}\right]h_{f,r}$$

upon using the property in (12) and assuming that $\Lambda=\text{constant}\times F$ (or instead of the Fourier transform any orthogonal transform with equal power in every element like the Hadamard transform) which is reasonably valid for optimal long preamble design. By (14), the data symbols received at subchannel f and antenna r at time n for a MIMO-OFDM system adopting, for instance, a VBLAST (Vertical Bell-Lab Layered Space-Time) structure, is $$\begin{bmatrix} Y_{f,1,n} \\ Y_{f,2,n} \\ \vdots \\ Y_{f,N_r,n} \end{bmatrix} = e^{j80\omega\left(n+\frac{128N_{LP}-31}{160}\right)}\left[\frac{\sin(32\omega)}{64\sin\left(\frac{\omega}{2}\right)}\right] \tag{17}$$

$$\begin{bmatrix} H_{f,1,1} & H_{f,1,2} & \cdots & H_{f,1,N_t} \\ H_{f,2,1} & H_{f,2,2} & \cdots & H_{f,2,N_t} \\ \vdots & \vdots & \ddots & \vdots \\ H_{f,N_r,1} & H_{f,N_r,2} & \cdots & H_{f,N_r,N_t} \end{bmatrix}\begin{bmatrix} X_{f,1,n} \\ X_{f,2,n} \\ \vdots \\ X_{f,N_t,n} \end{bmatrix}$$

$$= \frac{e^{j\omega\left[80\left(n+\frac{128N_{LP}-31}{160}\right)-64\left(\frac{N_{LP}+1}{2}-\frac{31}{128}\right)\right]}}{\left[\frac{\sin(32\omega N_{LP})}{N_{LP}\sin(32\omega)}\right]}$$

$$\begin{bmatrix} \hat{H}_{f,1,1} & \hat{H}_{f,1,2} & \cdots & \hat{H}_{f,1,N_t} \\ \hat{H}_{f,2,1} & \hat{H}_{f,2,2} & \cdots & \hat{H}_{f,2,N_t} \\ \vdots & \vdots & \ddots & \vdots \\ \hat{H}_{f,N_r,1} & \hat{H}_{f,N_r,2} & \cdots & \hat{H}_{f,N_r,N_t} \end{bmatrix}\begin{bmatrix} X_{f,1,n} \\ X_{f,2,n} \\ \vdots \\ X_{f,N_t,n} \end{bmatrix}$$

after making use of (16), implying $$\begin{bmatrix} X_{f,1,n} \\ X_{f,2,n} \\ \vdots \\ X_{f,N_t,n} \end{bmatrix} = \begin{bmatrix} \hat{H}_{f,1,1} & \hat{H}_{f,1,2} & \cdots & \hat{H}_{f,1,N_t} \\ \hat{H}_{f,2,1} & \hat{H}_{f,2,2} & \cdots & \hat{H}_{f,2,N_t} \\ \vdots & \vdots & \ddots & \vdots \\ \hat{H}_{f,N_r,1} & \hat{H}_{f,N_r,2} & \cdots & \hat{H}_{f,N_r,N_t} \end{bmatrix}^{-1} \cdot \tag{18}$$

$$\left(\left[\frac{\sin(32\omega N_{LP})}{N_{LP}\sin(32\omega)}\right]e^{-j80\omega\left[n+\frac{2(N_{LP}-1)}{5}\right]}\begin{bmatrix} Y_{f,1,n} \\ Y_{f,2,n} \\ \vdots \\ Y_{f,N_r,n} \end{bmatrix}\right).$$

While the amplitude attenuation $$\frac{\sin(32\omega N_{LP})}{N_{LP}\sin(32\omega)}$$

is time-invariant and negligible due to a small ω after frequency offset estimation and compensation based on the short preambles, the phase rotation term is an increasing function of time and is thus indispensable. Therefore to provide the amount of phase compensation for the distortion in both the channel estimate and the data symbols, the received signal values $Y_{f,r,n}$ are replaced by a residual frequency offset compensation unit 110 by $$\hat{Y}_{f,r,n} = Y_{f,r,n}e^{-j\left[n+\frac{2(N_{LP}-1)}{5}\right]\omega_{DATA,n-1}}, \tag{19}$$

$$n=1,2,\cdots,$$

$$f=1,2,3,\cdots,64, \text{ and}$$

$$f \neq \{8,22,44,58\}$$

After this, the signal values corrected in this way are supplied to a zero forcing interference suppression (ZFIS) unit 111 which serves also as a channel equalizer (and for data detection). The output of the ZFIS unit 111 is supplied to a decoder 112 which performs the decoding of the data.

Although the above development is derived for the VBLAST configuration, it is straightforward to show that the same compensation formula in (19) holds for a GSTBC (Groupwise Space-Time Block Code) system. It is also remarked that for the case when the long preambles are loaded with cyclic prefix, the same phase compensation can be readily applied to arrive at the equations Long preambles:

$$a_{LP,1} = 0, \quad (20)$$

$$a_{LP,n} = a_{LP,n-1} + \sum_{f \in [8,22,44,58]} \sum_{r=1}^{3} L_{f,r,n} L^*_{f,r,n-1}, n = 2, 3, \cdots, N_{LP}$$

$$\hat{\omega}_{LP,n} = \frac{\angle a_{LP,n}}{80}.$$

Data symbols:

$$a_{DATA,0} = a_{LP,N_{LP}}, \quad (21)$$

$$k_0 = 1,$$

$$D_{f,r,0} = L_{f,r,N_{LP}},$$

$$a_{DATA,n} = a_{DATA,n-1} + k_n k_{n-1} \sum_{f \in [8,22,44,58]} \sum_{r=1}^{3} D_{f,r,n} D^*_{f,r,n-1},$$

$$n = 1, 2, \cdots,$$

$$\hat{\omega}_{DATA,n} = \frac{\angle a_{DATA,n}}{80}$$

Phase compensation:

$$\hat{Y}_{f,r,n} = Y_{f,r,n} e^{-j\left[n + \frac{(N_{LP}-1)}{2}\right] \angle a_{DATA,n-1}}, \quad (22)$$

$$n = 1, 2, \cdots,$$

$$f = 1, 2, 3, \cdots, 64, \text{ and } f \neq \{8, 22, 44, 58\}$$

that yield identical performance using the pilot designs according to (3) and (7) since the difference lies only in a less efficient use of long preambles in communicating information.

In the embodiment described above, no channel estimation is required of the pilot subchannels. Instead, $a_{LP,n}$ is computed after each long preamble is received in accordance with (5).

Upon arrival of every OFDM symbol, $a_{DATA,n}$ is updated as specified in (9). Phase compensation on $Y_{f,r,n}$ is carried out to obtain $\hat{Y}_{f,r,m}$ in (19) for subsequent processing such as channel equalization, etc.

Simulation results show that the method provides almost perfect compensation. Simplicity in implementation is obvious as only a few inevitable non-linear operations are required by design.

In case of a MIMO OFDM system, in each long training preamble, signal field and OFDM symbol, eight of the subcarriers are in one embodiment dedicated to pilot signals in order to make the coherent detection robust against frequency offset and phase noise. These pilot signals shall be put in subcarriers −48, −34, −20, −6, 6, 20, 34, and 48. The pilots in the long training preamble are not modulated over time but those in the signal field and the OFDM data symbols shall be BPSK modulated by a pseudo binary sequence to prevent the generation of spectral lines. The contribution of the pilot subcarriers to each OFDM symbol is described in in the following.

The contribution of the pilot subcarriers for the $n^{th}$ OFDM symbol is produced by Fourier transform of sequence $P_{-58,58}$ or $P_{-53,53}$ given below.

First, define the sequence
$P_{-26,26} = \{0,0,0,0,0,1,0,0,0,0,0,0,0,0,0,0,0,1,$
$0,0,0,0,0,0,0,0,0,0,0,0,1,0,0,0,0,0,0, 0,0,0,0,0,0,0,−1,0,0,0,$
$0,0\}$.

then $P_{-53,53} = \{P_{-26,26}, 0, P_{-26,26}\}$.

$P_{-58,58} = \{P_{-26,26}, 0,0,0,0,0,0,0,0,0,0, P_{-26,26}\}$.

The polarity of the pilot subcarriers is controlled by the sequence, $p_n$, which is a cyclic extension of the 127 elements sequence and is given by $P_{0 \ldots 126} = \{1,1,1,1, −1,−1,−1,1, −1,−1,−1,−1, 1,1,−1,1, 1,1,$
$1,1, 1,1,1,1, 1,1,1,1, 1,1,1,1, 1,1,−1,1, 1,−1,−1,1, 1,1,−1,1,$
$−1,−1,−1,1, −1,1,−1,1, 1,−1,−1,1, 1,1,1,1, −1,−1,1,1, −1,−1,$
$1,−1, 1,−1,1,1, −1,−1,−1,1, 1,−1,−1,−1, −1,1,−1,−1, 1,−1,1,1,$
$−1,−1,−1,−1, −1,1,1,−1\}$ Each sequence element is used for one OFDM symbol. The first and second elements, $p_0$ and $p_1$, multiply the pilot subcarriers of the first and second SIGNAL symbol, respectively, while the elements from $p_2$ on are used for the DATA symbols.

In this document, the following publications are cited:

[1] "Part 11: wireless LAN medium access control (MAC) and physical layer (PHY) specifications: High-speed physical layer in the 5 GHz band." IEEE std 802.11a—1999: Supplement to IEEE 802.11-1999, September 1996

[2] S. Kay, "Statistically/Computationally efficient frequency estimation", ICASSP'98, pp. 2292-2294, vol. 4, 1998

The invention claimed is:

1. A method carried out by a communication system comprising a transmitter and a receiver for determining a residual frequency offset between the transmitter and the receiver in a transmission of data via a communication channel of the communication system, wherein: a message is transmitted from the transmitter to the receiver via the communication channel; the message comprises at least one short preamble, at least one long preamble and user data; the at least one long preamble comprises residual frequency offset determination information; and the residual frequency offset is determined by the receiver based on the residual frequency offset determination information by a recursive estimation algorithm based on a linear prediction method without using channel estimates of the communication channel, wherein the residual frequency offset is determined by the receiver based on the received residual frequency offset determination information which is given by $$L_{f,r,n} = \left( \sum_{t=1}^{N_t} H_{f,r,t} \Lambda_{f,t,n} \right) e^{j64\omega n} + V_{f,r,n}$$

wherein f denotes a subchannel index, t denotes a transmit antenna index, r denotes a receive antenna index, n is a time index, $H_{f,r,t}$ denotes the channel gain of the subchannel f established between transmit antenna t and receive antenna r, ω denotes the residual frequency offset, $V_{f,r,n}$ denotes the Average White Gaussian Noise sample and wherein $$\Lambda_{f,t,n} = \begin{cases} 1, & \text{if } f \in \{8, 44, 58\} \\ -1, & \text{if } f = 22 \end{cases}$$

is the frequency offset determination information.

2. A method according to claim 1, wherein the at least one short preamble comprises frequency offset determination information and a frequency offset is determined based on the frequency offset determination information.

3. A method according to claim 1, wherein the user data comprises further residual frequency offset determination information and a residual frequency offset determination is carried out based on the further residual frequency offset determination information.

4. A method according to claim 1 wherein the communication channel comprises at least one data subchannel and at least one pilot subchannel.

5. A method according to claim 4, wherein the at least one long preamble further comprises channel estimation information based on which a channel estimation is performed to determine the transmission characteristics of the communication channel and the residual frequency offset determination information is transmitted via the at least one pilot subchannel and the channel estimation information is transmitted via the at least one data subchannel.

6. A method according to claim 1, wherein the message is transmitted via a plurality of transmit antennas.

7. A method according to claim 1, wherein the message is received via a plurality of receive antennas.

8. A method according to claim 1, wherein the message is transmitted according to OFDM.

9. A method according to claim 1, wherein, when the residual frequency offset has been determined based on the residual frequency offset determination information, a phase compensation is carried out for at least one signal value which is received in the transmission of the message based on the determined residual frequency offset.

10. The Method according to claim 1, wherein the user data comprises further frequency offset determination information and the residual frequency offset is further determined by the receiver based on the received further residual frequency offset determination information according to $$\hat{\omega} = \frac{1}{80} L \sum_{n=2}^{\infty} k_n k_{n-1} D_{f,r,n} D^*_{f,r,n-1}$$

wherein
f denotes a subchannel index,
r denotes a receive antenna index,
n is a time index
$D_{f,r,n}$ are received user data signal values and $k_n \in \{1,-1\}$.

11. A communication system comprising a transmitter and a receiver wherein: the transmitter is adapted to transmit a message from the transmitter to the receiver via a communication channel wherein the message comprises at least one short preamble, at least one long preamble and user data and the at least one long preamble comprises residual frequency offset determination information; and the receiver is adapted to determine a residual frequency offset between the transmitter and the receiver in the transmission of data via the communication channel based on the residual frequency offset determination information by a recursive estimation algorithm based on a linear prediction method without using channel estimates of the communication channel, wherein the residual frequency offset is determined by the receiver based on the received residual frequency offset determination information which is given by $$L_{f,r,n} = \left( \sum_{t=1}^{N_t} H_{f,r,t} \Lambda_{f,t,n} \right) e^{j64\omega n} + V_{f,r,n}$$

wherein f denotes a subchannel index, t denotes a transmit antenna index, r denotes a receive antenna index, n is a time index $H_{f,r,t}$ denotes the channel gain of the subchannel f established between transmit antenna t and receive antenna r, ω denotes the residual frequency offset, $V_{f,r,n}$ denotes the Average White Gaussian Noise sample and wherein $$\Lambda_{f,t,n} = \begin{cases} 1, & \text{if } f \in \{8, 44, 58\} \\ -1, & \text{if } f = 22 \end{cases}$$

is the frequency offset determination information.

12. A method for processing a message by a receiver of a communication system wherein: a message is received from a transmitter of the communication system via a communication channel which message comprises at least one short preamble, at least one long preamble and user data, wherein the at least one long preamble comprises residual frequency offset determination information; and a residual frequency offset between the transmitter and the receiver in a transmission of data via the communication channel is determined based on the residual frequency offset determination information by a recursive estimation algorithm based on a linear prediction method without using channel estimates of the communication channel, wherein the residual frequency offset is determined by the receiver based on the received residual frequency offset determination information which is given by $$L_{f,r,n} = \left( \sum_{t=1}^{N_t} H_{f,r,t} \Lambda_{f,t,n} \right) e^{j64\omega n} + V_{f,r,n}$$

wherein f denotes a subchannel index, t denotes a transmit antenna index, r denotes a receive antenna index, n is a time index, $H_{f,r,t}$ denotes the channel gain of the subchannel f established between transmit antenna t and receive antenna r, ω denotes the residual frequency offset, $V_{f,r,n}$ denotes the Average White Gaussian Noise sample and wherein $$\Lambda_{f,t,n} = \begin{cases} 1, & \text{if } f \in \{8, 44, 58\} \\ -1, & \text{if } f = 22 \end{cases}$$

is the frequency offset determination information.

13. A receiver comprising:
a receiving unit adapted to receive a message from a transmitter via a communication channel which message comprises at least one short preamble, at least one long preamble and user data, wherein the at least one long preamble comprises residual frequency offset determination information; and
a determining unit adapted to determine a residual frequency offset between the transmitter and the receiver in a transmission of data based on the residual frequency offset determination information by a recursive estimation algorithm based on a linear prediction method without using channel estimates of the communication channel.

* * * * *